United States Patent
Minyard

(10) Patent No.: US 6,345,282 B1
(45) Date of Patent: Feb. 5, 2002

(54) MULTI-PROCESSOR DATA SYNCHRONIZATION METHOD AND APPARATUS

(75) Inventor: Trenton Corey Minyard, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/408,619

(22) Filed: Sep. 30, 1999

(51) Int. Cl.$^7$ .............................................. G06F 17/30
(52) U.S. Cl. ....................................... 707/204; 707/203
(58) Field of Search ................................. 707/204, 200, 707/201, 202, 203, 205; 714/2, 37; 709/203

(56) References Cited

U.S. PATENT DOCUMENTS

| | | | |
|---|---|---|---|
| 5,794,252 A | * 8/1998 | Bailey et al. | 707/202 |
| 5,835,915 A | * 11/1998 | Carr et al. | 707/202 |
| 5,923,832 A | * 7/1999 | Shirakihara et al. | 714/37 |
| 6,061,714 A | * 5/2000 | Housel, III et al. | 709/203 |
| 6,247,141 B1 | * 6/2001 | Holmberg | 714/2 |

OTHER PUBLICATIONS

Mullender, Sape, excerpts from Distributed Systems, 2$^{nd}$, ACM Press, NY, NY, pp. 255, 329–352, 413–417 (1993).
Powell, David, "Group Communication," Communications of the ACM, NY, NY, vol. 39, No. 4., pp. 50–53 (Apr. 1996).
Moser, L.E., et al., "Totem: A Fault–Tolerant Multicast Group Communication System," Communications of the ACM, NY, NY, vol. 39, No. 4. pp. 54–63 (Apr. 1996).
Kim et al., "Process allocation for load distribution in fault–tolerant multicomputers", IEEE 1995, Jun. 30, 1995, pp. 174–183.*
Kim et al., "An efficient protocol for checkpointing recovery in distributed systems", Parallel and distributed systems, IEEE transactions, pp. 955–960, Aug. 1993.*
Cao et al., "Design and analysis of an efficient algorithm for coordinated checkpointing in distributed systems", Advances in parallel and distributed computing, 1 proceedings, pp. 261–268, Mar. 1997.*
Manivannan et al., "Quasi–synchronous checkpointing: Models, Characterization and classification" Parallel and distributed systems, IEEE transactions, pp. 703–713, Jul. 1999.*

* cited by examiner

Primary Examiner—Sanjiv Shah
(74) Attorney, Agent, or Firm—Carr & Storm, L.L.P.

(57) ABSTRACT

Disclosed is a method and an apparatus that can provide backup CPU data synchronization in a time minimization process. All external messages received, that are to be processed by a primary CPU 12, are also stored in a message list 24 of the backup CPU 14. Check-point message data is intelligently stored in the backup CPU 14 by first deleting related external messages from backup message list 24 and then creating a record if none already exists and filling only those fields referenced in the check-point message. If a record does exist, only the check-point message data fields are altered in that existing record. When a data synchronization record is received by the backup CPU 14, a check is made to see if such a record has already been created by a check-point message. If not, a record is created in the backup CPU database 22 and all the fields are made to correspond with the received data synchronization record message. If such a record is found, only those fields not already containing data are filled from the received data synchronization record message. In this manner a single pass through the primary CPUs database 18 is sufficient to obtain data synchronization of the backup CPU 14.

15 Claims, 4 Drawing Sheets

MULTI-PROCESSOR DATA SYNCHRONIZATION METHOD AND APPARATUS

TECHNICAL FIELD

The invention relates generally to data communications and, more particularly, to the synchronization of data communicated to a primary processor and one or more backup processors.

BACKGROUND

When a manufacturing process or other automated operation utilizing central processing units ("CPUs", also referred to as computer processors) is designed, a factor that needs to be taken into account is the problem of reliability of the CPU. The problem of failure of a primary CPU is commonly solved by providing one or more backup CPUs that can be placed online to take over the process of a failed primary CPU.

With some processes or operations, a switchover between a primary CPU and a backup CPU is simply accomplished. In a cellular telephone system, a single record keeping CPU may be used to process, or otherwise act upon, incoming data messages from other processors relative to the, activation or deactivation of a cellular phone, cell location or change of cell location of each of the active cellular phones, updating services available to a given phone and so forth. As a part of this operation, the CPU maintains a database comprising a record for each of the cellular phones in the system. These records will each contain many different items of data such as a phone number assigned to a given phone, cell location of the phone, a flag indicating whether or not the phone is active, a flag indicating whether the phone has been granted call forwarding privileges, and the like. The records in each of the backup CPUs must be maintained current for each such phone. Since the backup CPUs may fail or be taken off-line for maintenance, it will be apparent that a major operation involving transfer of data is required before a backup CPU may be considered to be synchronized relative to a primary CPU. Synchronization, for the purposes of this paper, means that both the primary and the backup CPUs under consideration have identical records and an identical list of messages.

In the art of CPU synchronization, the records of a database may also be referred to as "objects" wherein each object comprises a set of data items, also referred to as "fields", uniquely identified with respect to that object. Both the primary CPU and any backup CPUs may receive and store outside messages from other sources. The term "checkpoint" is used to refer to a message, normally sent from the primary CPU to a backup CPU, that comprises only the data items that have recently changed as a result of processing, by the primary CPU, of a received outside message. Synchronization (often abbreviated as "sync") messages typically include all the data items of a single object or record, and are sent from the primary CPU to the backup CPU(s).

Many prior art systems having backup CPUs have required the stoppage of processing of incoming messages while data is being synchronized, resulting in delays and inefficiency of processing.

To avoid stoppages of processing, some prior art systems kept backup copies of every changed data item and only sent the old data to any newly online backup CPU. In such a system this newly online backup CPU must apply all the data updates and queue all received messages. Once the data transfer is complete, the new backup CPU must then apply all the queued messages before reaching synchronization.

Another prior art method of obtaining synchronization is to transfer all the data records of the primary CPU to the newly online backup CPU enough times to make sure that all the records that were changed during the first transfer are properly updated in the backup CPU. This type of synchronization process is referred to in the art as a multi-pass process. A modification of this multi-pass approach is to maintain a separate primary CPU database of all records changed during the initial transfer and change those records on subsequent data transfer passes.

In a cellular telephone system, involving thousands of customers, the data transfer required to a newly online backup CPU, while the system is running, may take many hours when using prior art synchronization approaches. In such a system, the large data stores, high transaction rates and low downtime requirements mandates that newly online backup CPUs be able to synchronize without special memory or queuing requirements and in a minimal time. It would thus be desirable to accomplish synchronization in a single pass process.

SUMMARY OF THE INVENTION

The present invention, accordingly, provides a method and system for synchronizing the contents of a backup computer database to a primary computer database. The method comprises receiving data synchronization record messages and checkpoint messages from a primary computer, and detecting whether or not a backup record exists in the backup computer database corresponding to the received message. Upon detecting that a backup record does not exist in the backup computer database corresponding to the received message, a backup record is created in the backup computer database. The method further comprises detecting whether the received message is a synchronization record message or a checkpoint message. If it detected that the received message is a synchronization record message, then the data is copied from the received data synchronization record message to the backup record for each field that was not already in the backup record. If it detected that the received message is a checkpoint message, then data is copied from fields in the checkpoint message to corresponding fields in the backup record as set forth in the check-point message. The foregoing steps are repeated until synchronization is completed.

The present invention thus provides for synchronization of data between a primary and backup computer database to be achieved in a single pass process, thereby enabling newly online backup CPUs be able to synchronize without special memory or queuing requirements and in a minimal time.

BRIEF DESCRIPTION OF THE DRAWINGS

For a more complete understanding of the present invention, and its advantages, reference will now be made in the following Description to the accompanying drawings, in which.

DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in block and schematic diagram form in order not to obscure the present invention in unnecessary detail. Additionally, for the most part, details concerning data communications, and the like have been omitted inasmuch as such details are not necessary to obtain a complete understanding of the present invention and are within the skills of persons of ordinary skill in the relevant art.

Figure 1:
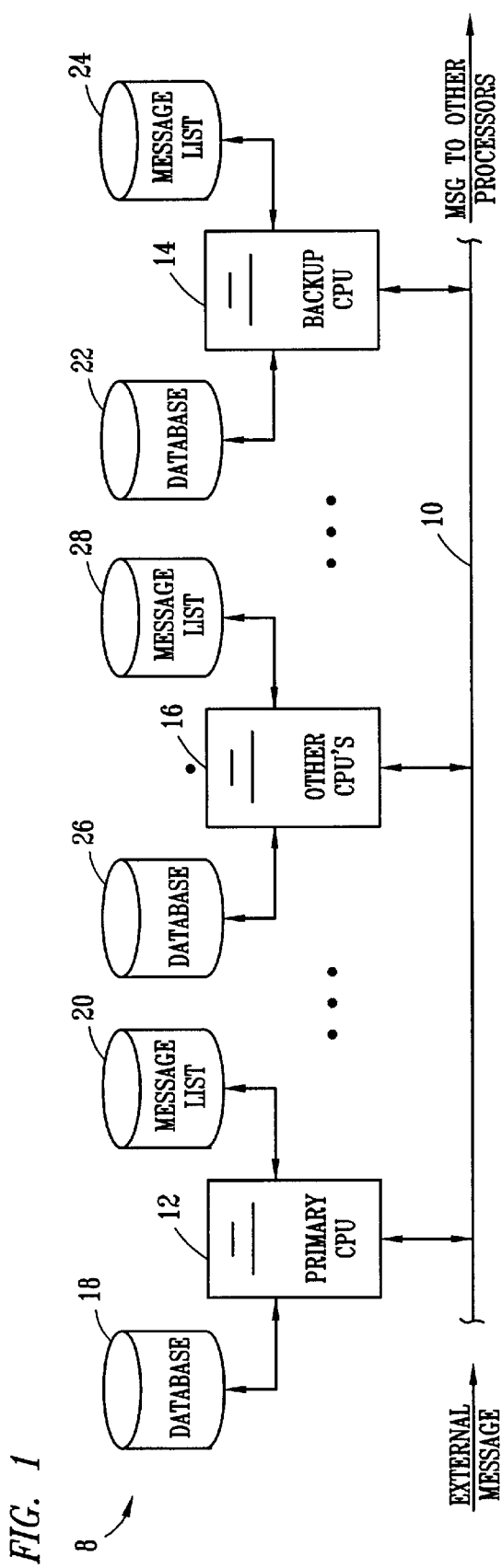
FIG. 1 is a block diagram of a portion of a communication loop interconnecting a primary CPU and a backup CPU to be synchronized with the primary CPU in accordance with the present invention.

Referring to FIG. 1 of the drawings, the reference numeral 8 generally designates a data communication network embodying features of the present invention. The system 8 includes a common communication link or line 10 connected to an active or primary CPU 12 and to a backup CPU 14 that requires synchronization with the CPU 12. The link 10 is commonly configured in the form of a loop network including a gateway facilitating connection to other networks, and is preferably configured to transmit data in serial format, though, alternatively, may be configured to transmit data in a parallel format. The link 10, additionally, is connected to a source (not shown) of external messages, to other CPUs 16, and may supply messages to other processors not shown. One or more of other CPUs 16 may constitute additional backup CPUs that are synchronized with the primary CPU 12, or awaiting such synchronization. In the application of this invention to a cellular telephone system, the source of external messages may be administrative computers in the system, the cellular phones themselves, other system resources, or the like. Although not directly pertinent to the invention per se, the other CPUs 16 may include additional primary CPU(s) in some embodiments of the invention, wherein each primary CPU handles a subset of the transactions and updates the other primary CPUs via checkpoints. A token passing network configuration referred to as "Totem" is often used for reliable data message transfer in such loops network. However the type of network is not pertinent to the working of the present invention.

As further shown in FIG. 1, the primary CPU 12 maintains a database 18 comprising a plurality of records and a message list 20 typically comprising a plurality of unprocessed messages. The backup CPU 14 includes storage capability for a database 22 comprising a plurality of backup records, and a message list 24. As will be apparent, the database 22 would contain no records and no external messages at the start of synchronization after CPU 14 had previously failed and had been taken off line. Each of the other CPUs 16 also include storage capability for a database 26 and a message list 28.

Figure 2:
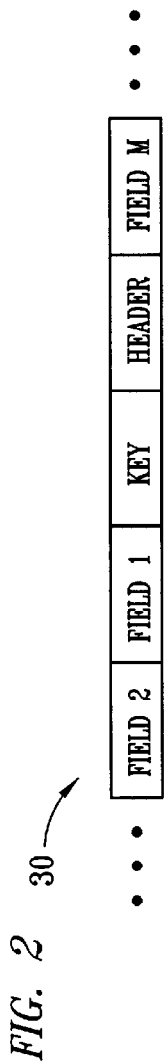
FIG. 2 is a depiction of the structure of a serial format message flowing through the communication loop of FIG. 1.

FIG. 2 depicts a preferred basic format of messages, designated by the reference numeral 30, transmitted over the link 10. Each message 30 includes a header, a key, and further data. In FIG. 2, further data is shown as a plurality of data items or fields 1 through n that constitute a complete record in one section of the database 18. The key for the example being used may comprise the telephone number of a given cellular phone, its unique electronic code assigned by the manufacturer of the phone, or the like. The key typically constitutes a portion of the database but, since it is unique, it has been separated from the remaining fields for the purpose of this discussion. The header typically includes data to inform a receiving device, such as the CPUs 12, 14 and 16, whether the message is intended for their use. This included data may be merely in the form of defining the message as external, check-point or sync record. The header may also include data defining the length of the message for simplifying detection of received messages.

Figure 3:
FIG. 3 is a depiction of the structure of an external message being received by the primary CPU and the associated backup CPUs of FIG. 1.

FIG. 3 presents a preferred format of an externally generated ("external") message 32 including a header and key similar to that shown in FIG. 2. The difference between the messages 30 and 32 is that instead of fields of data as such, the message 32 may instruct the primary CPU to change the status of a cell phone record from inactive to active, change the recorded location or possibly add services that are available to a given subscriber. It is recognized that such a message 32 may take the form of a plurality of fields but has been labeled as shown to distinguish these messages from those transmitted between the CPU 12 and the CPU 14 in a synchronization process.

Figure 4:
FIG. 4 is a depiction of the structure of a checkpoint message transmitted from the primary CPU of FIG. 1 to all backup CPUs associated therewith.

FIG. 4 illustrates a preferred format of a check-point message 34 comprising a header, a key, and fields 3 and 7. Such a message would act to alter only the third and seventh fields in an existing record corresponding to the key field of a backup CPU such as the CPU 14.

Figure 5A:
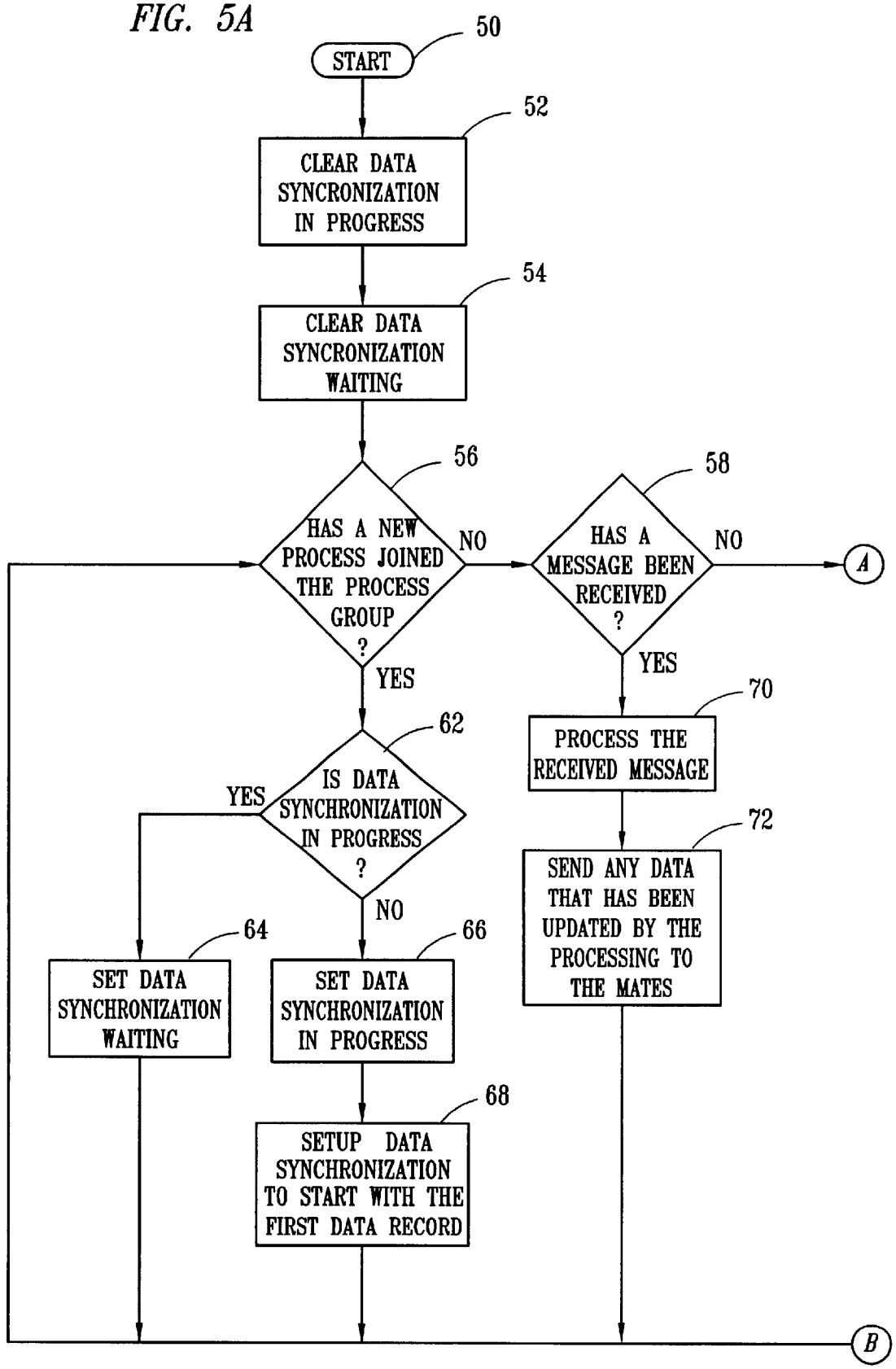
FIG. 5 is a flow diagram representing steps executed by the primary CPU in accordance with the present invention.
Figure 5B:
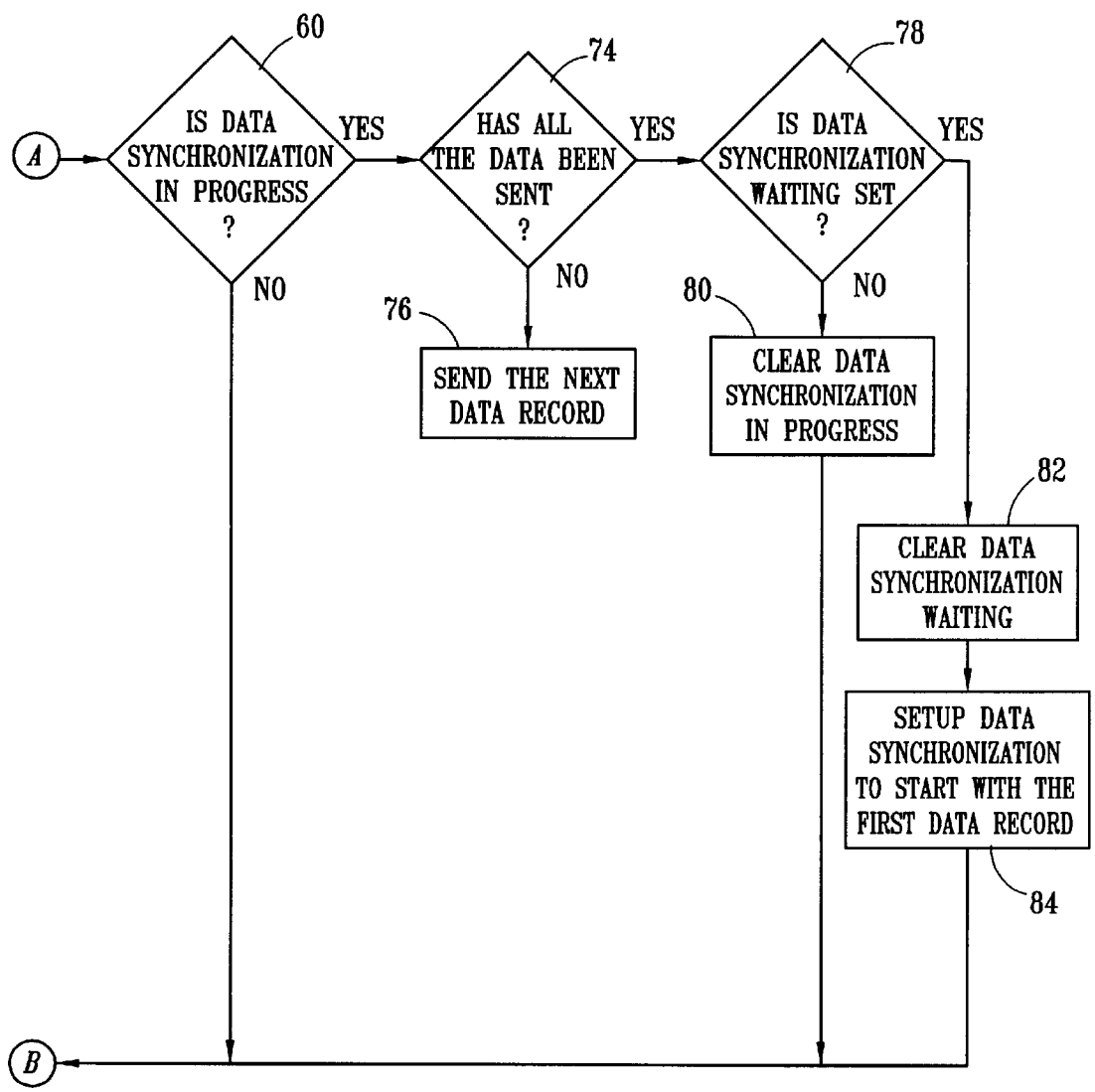

FIG. 5 depicts preferred steps executed by the primary CPU 12 to bring the backup CPU 14 into synchronization with the CPU 12. The synchronization process is initiated when the CPU 12 becomes the active or primary CPU, and then proceeds to step 52 to clear a Boolean flag or logic indicator (not shown) relating to any data synchronization in progress. As will be appreciated, nothing may be in progress at initiation of the synchronization process. Execution then proceeds to step 54 wherein a further Boolean flag (not shown) is cleared relating to whether or not there is a further backup CPU waiting to be synchronized.

In step 56, a determination is made whether a new process commencing new actions has joined the process group. Processes and process groups are considered to be well-known in the art (see, for example, "Distributed Systems" authored by Sape Mullender, ACM Press) and therefore will not be discussed in further detail herein. Thus, data synchronization may be required when either an additional backup CPU is placed online or when the primary CPU commences a new process in place of or in addition to the processes or tasks previously being completed. In any of these situations, data synchronization of any backup CPUs is of concern. If a determination is made in step 56 that no new process has joined the group, a decision step 58 is executed to detect whether or not an external message has been received. If no external message has been received, a decision step 60 is executed to check the Boolean flag as to whether or not data synchronization is in progress. If not, the process returns to decision step 56. If in decision step 56 it is ascertained that a new process has joined the group, a decision step 62 is activated in a manner identical to step 60. If it is determined that data synchronization is presently in progress, the data synchronization waiting flag is set in step 64 and there is a return to step 56. If step 62 finds that the data synchronization flag has not been set yet, it is set in step 66 and in step 68 setup is commenced to start data synchronization with the first record in the appropriate database. The process then returns to step 56. When in step 58 it is determined that a message has been received, the message is processed in step 70 and then in a step 72, after the primary CPU database 18 has been updated, a check-point message is sent to any associated backup CPUs. The process then returns to step 56. When in step 60 it is determined that data synchronization is in progress, a decision step 74 checks to see if all the data has been sent. If it has not, the next record is sent in step 76 before returning to step 56. If all the records have been sent, a decision step 78 checks to see if the data synchronization waiting flag has been set. If it has not, a data synchronization in progress flag is cleared in a step 80 before returning to step 56. If the data synchronization waiting flag has been set, the data synchronization waiting flag is cleared in step 82 and then setup is commenced in step 84 in the manner previously discussed in connection with step 68 before returning to step 56.

Figure 6:
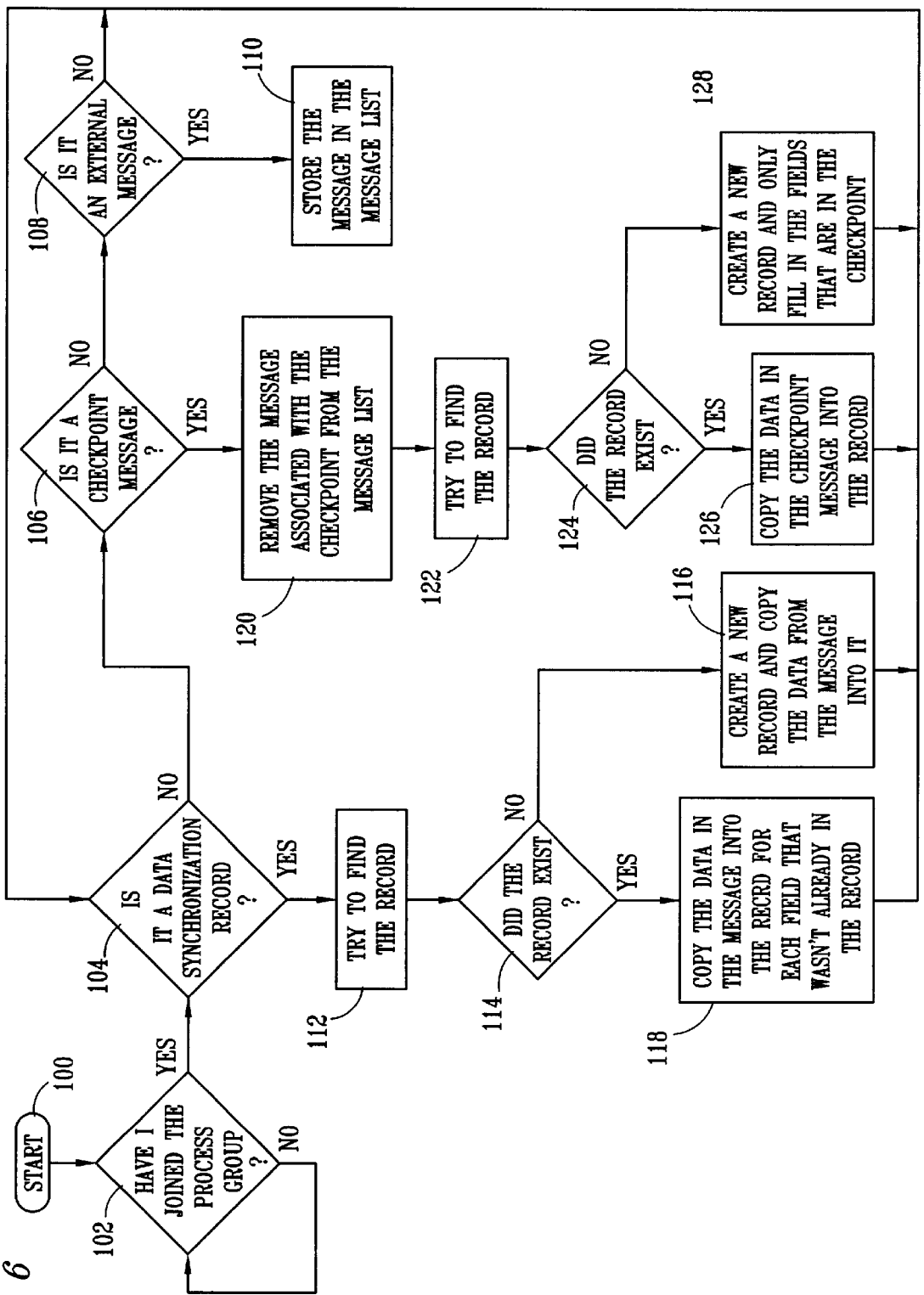
FIG. 6 is a flow diagram representing steps executed by the backup CPU when being synchronized with the primary CPU of FIG. 1.

In FIG. 6, a backup CPU such as the CPU 14 commences the data synchronization process as shown at step 100, and proceeds to a decision step 102 until it is determined that the CPU has joined a process group. At this time the process continues to decision step 104 which checks to determine if an incoming message is a data synchronization record. If not, a decision step 106 checks to determine if the message is a check-point message. If not, a decision step 108 checks to determine if an external message has been received. If it is, the message is stored in the message list in accordance with a step 110 and the process returns to step 104. If decision step 108 determines an external message has not been received, step 104 is again executed. When step 104 finds that a data synchronization record has been received, the key in that message is used in a step 112 to find the record in database 22. If the record is determined to not exist in a decision step 114, a new record is created as set forth in step 116 and the data from this message is copied into the record before returning to step 104. If, on the other hand, such a record is found in step 114 to exist, the data is copied, in accordance with a step 118, from that message only into fields not already containing data from a check-point message before returning to step 104. When step 106 detects a check-point message, the message in the message list 24, associated with the key in the check-point message, is deleted or otherwise removed from list 24 as set forth in a step 120 before trying to find the record identified by the key as set forth in step 122. If, in a decision step 124, a record corresponding to the key is found to already exist in database 22, the data in the check-point message in copied into the appropriate fields of that record in accordance with a step 126. If step 124 determines that such a record does not exist in database 22, a new record is created in a step 128 and only the fields presented in the check-point message are filled with data. The next step after either step 126 or 128 comprises a return to step 104.

From the foregoing, it may be determined that the present apparatus can provide backup CPU data synchronization in a time minimization process. All external messages received by the backup CPU subsequent to the commencement of data synchronization, that are to be processed by the primary CPU, are stored in a message list of the backup CPU. Check-point message data is intelligently stored by first deleting related external messages from message list storage and then creating a record if none exists and filling only those fields referenced in the check-point message. If, on the other hand, a record does exist, only the check-point message data fields are altered in that existing record. When a data synchronization record is received by the backup CPU, a check is made to see if such a record has already been created by a check-point message. If not, a record is created in the backup CPU database and all the fields are made to correspond with the received data synchronization record message. If such a record is found, only those fields not already containing check-point data are filled from the received data synchronization record message. In this manner a single pass through the primary CPUs database is sufficient to obtain data synchronization of the backup CPU.

The invention as shown and described above illustrates operation in a group communication environment, also referred to as virtual synchrony or reliable broadcast. More information on group communication and reliable broadcast may be found in the book entitled (Distributed Systems, authored by Sape Mullender, ACM Press, pp. 97–138, 465–470, 478–481), incorporated herein by reference. Some facets of the invention as shown and described are only required in a group communication environment. One such facet is joining process groups, and another facet is having each processor maintain a list of messages that have not been processed. However, the basic check-pointing mechanism of this invention will operate in more simply structured prior art fault tolerant active-standby systems that do not incorporate virtual synchrony.

It should be noted that the present invention may be used in a virtual synchrony system that provides "total order", such as the Totem system (Communications of the ACM, April 1996, pp. 54–63). Such a total order system may be used to achieve perfect synchronization so that no transactions or data are lost when the active processor is shut down or fails.

It should be further noted that some fault tolerant systems have multiple primary CPUs. In such systems, each primary CPU handles a subset of the transactions and updates the other primary CPUs with checkpoints, as opposed to the more standard primary/backup systems described above. Multiple primary CPUs do not work well with prior art check-pointing systems. However the present invention works correctly with either single or multiple primary CPUs with no alterations. The use of multiple primary CPUs, however, does require the use of a totally ordered virtual synchrony system.

Although the invention has been described with reference to a specific cellular telephone embodiment, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention. Such alternate embodiments include having more than one backup CPU as well as having different backup CPUs for different processes of the primary CPU. Further while the drawing of FIG. 1 only shows one database and message list for the primary CPU, the invention includes the situation where the CPU 12 is multitasking many different processes each having its own list of process messages and separate databases.

What is claimed is:

1. A method of synchronizing the contents of a backup computer database to a primary computer database, the method comprising the steps of:

a) receiving data synchronization record messages and checkpoint messages from a primary computer;

b) detecting whether or not a backup record exists in the backup computer database corresponding to the received message;

c) upon detecting that a backup record does not exist in the backup computer database corresponding to the received message, creating a backup record in the backup computer database;

d) detecting whether the received message is a synchronization record message or a checkpoint message;

e) upon detecting that the received message is a synchronization record message, copying data from the received data synchronization record message to the backup record;

f) upon detecting that the received message is a checkpoint message, copying data from fields in the checkpoint message to corresponding fields in the backup record as set forth in the check-point message g) repeating steps a–f until synchronization is completed.

2. The method of claim 1 wherein the step of receiving data synchronization record messages and/or checkpoint messages from a primary computer further comprises receiving data synchronization record messages, checkpoint messages, and/or external messages from the primary computer, and the step of detecting whether the received message is a synchronization record message or a checkpoint message further comprises detecting whether the received message is a synchronization record message, a checkpoint message, or an external message, and the method further comprises the steps of:

a) upon detecting that the received message is an external message, storing the external message in a message list in the backup computer;

b) receiving a checkpoint message from the primary computer that overrides the external message; and c) removing the external message from the message list.

3. The method of claim 1 wherein the step of copying data from the received data synchronization record message to the backup record further comprises determining whether the backup record was created in response to receipt of the data synchronization record message; and a) upon a determination that the backup record was created in response to receipt of the data synchronization record message, copying all data from the received data synchronization record message to the backup record; and b) upon a determination that the backup record was not created in response to receipt of the data synchronization record message, copying only data from the received data synchronization record message to the backup record into fields of the backup record that do not contain data.

4. A backup computer including database storage means comprising in combination:

a) message receiving means for receiving data synchronization record messages and checkpoint messages from a primary computer;

b) detection means for detecting whether or not a backup record exists in the backup computer database related to the received message;

c) record creation means responsive to a determination that a backup record is not detected for creating a new backup record in the backup computer database;

d) detection means for detecting whether a received message is a data synchronization record message or a checkpoint message;

e) means responsive to detecting that the received message is a data synchronization record message for copying data fields from a received data synchronization record message into the backup record; and f) means responsive to detecting that the received message is a checkpoint message for filling in only fields of the backup record as set forth in the received checkpoint message.

5. A method of synchronizing the contents of a backup computer database to a primary computer database comprising the steps of:

a) receiving data synchronization record messages and checkpoint messages from a primary computer;

b) detecting whether the received message is a synchronization record message or a checkpoint message;

c) detecting whether or not a backup record exists in the backup computer database related to the received message;

d) when the previous existence of such a record is not detected, creating a new backup record in the backup computer database and either
 I. filling in only the fields set forth in a received check-point message, or
 II. copying all the data fields from a received data synchronization record message;

e) copying the data in a received check-point message into the associated fields of an existing record;

f) copying the data in a received data synchronization record message into only the associated fields of an existing record that did not previously contain data; and g) repeating steps a–f until synchronization is completed.

6. The method of claim 5 comprising the additional steps of:

receiving external messages and storing same in a message list in the backup computer; and removing an external message from the message list upon detecting of a associated check-point message.

7. A backup computer including database storage means comprising in combination:

a) message receiving means for receiving data synchronization record messages and checkpoint messages from a primary computer;

b) first detection means for detecting whether the received message is a synchronization record message or a checkpoint message;

c) second detection means for detecting whether or not a record presently exists in the backup computer database related to the presently received message;

d) record creation means, when the previous existence of such a record is not detected, for creating a new record in the backup computer database and either,
 I. filling in only the fields set forth in a received check-point message, or
 II. copying all the data fields from a received data synchronization record message into the newly created record;.

e) means for copying the data in a received check-point message into the associated fields of an existing record;

f) means for copying the data in a received data synchronization record message only into the associated fields of an existing record that did not previously contain data; and g) means for processing further received messages until synchronization is completed.

8. A method of providing synchronization of a backup computer database to a primary computer database, the method comprising the steps of:

a) transmitting data synchronization record messages and checkpoint messages from a primary computer to a backup computer;

b) detecting whether or not a backup record related to the received message exists in the backup computer database;

c) in response to detecting that a backup record related to the received message does not exist in the backup computer database, creating a new backup record in the backup computer database;

d) detecting whether the message received at the backup computer is a data synchronization record message or a checkpoint message;

e) in response to detecting that the message received at the backup computer is a checkpoint message, filling in only the fields set forth in a received check-point message; and f) in response to detecting that the message received at the backup computer is a data synchronization record message, copying data fields from the received data synchronization record message into the backup record.

9. A method of synchronizing a backup computer database to a primary computer database comprising the steps of:

supplying check-point and data sync record messages from a primary computer to a backup computer;

copying check-point data into like fields of an associated backup record in the backup computer if such a backup record is determined to already exist in a backup computer database, otherwise creating a new record in the database of the backup computer and filling only the fields supplied in the check-point data message; and copying data sync record message data into fields of an associated record previously unfilled with data in the backup computer if such a record is determined to already exist in a backup computer database, otherwise creating a new record in the database of the backup computer and copying the data from the data sync record message into the new record.

10. The method of claim 9 further comprising the step of determining whether or not a record already exists in the backup computer database corresponding to the data in a received message.

11. A redundant computer system including means for synchronizing a backup computer database to a primary computer database, the system comprising:

means for supplying check-point and data sync record messages from a primary computer to a backup computer to be synchronized;

means for determining whether or not a record already exists in the backup computer database corresponding to the data in a received message;

creating and copying means for copying check-point data into like fields of an associated record in the backup computer if such a record to determined to already exist in a backup computer database, otherwise creating a new record in the database of the backup computer and filling only the fields supplied in the check-point data message; and copying data sync record message data into fields of an associated record previously unfilled with data in the backup computer if such a record is determined to already exist in a backup computer database, otherwise creating a new record in the database of the backup computer and copying the data from the data sync record message into the new record.

12. A backup computer including data storage means comprising in combination:

a) detection means for detecting whether or not a record presently exists in the backup computer database related to a currently received one of check-point and record synchronization messages;

b) record creation means, when the previous existence of such a record is not detected, for creating a new record in the backup computer database and performing one of,
   I. filling in only the fields set forth in a received check-point message, or
   II. copying all the data fields from a received data synchronization record message into the newly created record;

c) means for copying the data in a received check-point message into the associated fields of an existing record;

d) means for copying the data in a received data synchronization record message only into the associated fields of an existing record that did not previously contain data; and e) means for processing further received messages as set forth in paragraphs a–d until synchronization is completed.

13. The backup computer claimed in claim 12 further comprising:

means for receiving external messages and storing same in a message list; and means for removing an external message from the message list upon detecting of a associated check-point message.

14. A synchronization method comprising the steps of:

a) receiving data synchronization record messages and check-point messages from a primary computer;

b) detecting whether the received message is a synchronization record message or a check-point message;

c) detecting whether or not a backup record exists in the backup computer database related to the received message;

d) when the previous existence of such a record is not detected, creating a new backup record in the backup computer database and either
   III. filling in only the fields set forth in a received check-point message, or
   IV. copying all the data fields from a received data synchronization record message;

e) copying the data in a received check-point message into the associated fields of an existing record;

f) copying the data in a received data synchronization record message into only the associated fields of an existing record that did not previously contain data.

15. The method of claim 14 comprising the additional steps of:

receiving external messages and storing same in a message list in the backup computer; and removing an external message from the message list upon detecting of a associated check-point message.

* * * * *